(12) United States Patent
Kozar et al.

(10) Patent No.: US 7,910,845 B2
(45) Date of Patent: Mar. 22, 2011

(54) REMOVABLE RACKING SYSTEM FOR AN ELECTRICAL SWITCHING APPARATUS

(75) Inventors: Aaron T. Kozar, Zelienople, PA (US); Frankie K. Ostrowski, Natrona Heights, PA (US); Paul R. Rakus, Beaver Falls, PA (US); Lawrence T. Connor, Venetia, PA (US); David M. Olszewski, Coraopolis, PA (US)

(73) Assignee: Eaton Corporation, Cleveland, OH (US)

( * ) Notice: Subject to any disclaimer, the term of this patent is extended or adjusted under 35 U.S.C. 154(b) by 984 days.

(21) Appl. No.: 11/744,570

(22) Filed: May 4, 2007

(65) Prior Publication Data

US 2008/0273293 A1 Nov. 6, 2008

(51) Int. Cl.
*H01H 33/42* (2006.01)
*H01H 9/20* (2006.01)
*H01H 9/24* (2006.01)

(52) U.S. Cl. .............................. 200/50.24; 200/50.21
(58) Field of Classification Search ............. 200/50.24
See application file for complete search history.

(56) References Cited

U.S. PATENT DOCUMENTS

| 3,663,773 | A | * | 5/1972 | Powell | 200/50.24 |
| 4,002,865 | A | * | 1/1977 | Kuhn et al. | 200/50.22 |
| 7,019,229 | B1 | * | 3/2006 | Weister et al. | 200/50.17 |

* cited by examiner

*Primary Examiner* — Renee Luebke
*Assistant Examiner* — Lheiren Mae A Caroc
(74) *Attorney, Agent, or Firm* — Martin J. Moran

(57) ABSTRACT

A modular racking system for an electrical switching apparatus is provided. The modular racking system includes a carriage assembly structured to support electrical switching apparatus and at least one cam follower structured to be removably coupled to the electrical switching apparatus.

20 Claims, 8 Drawing Sheets

REMOVABLE RACKING SYSTEM FOR AN ELECTRICAL SWITCHING APPARATUS

CROSS REFERENCE TO RELATED APPLICATION

This application is related to commonly assigned U.S. patent application Ser. No. 11/693,198, filed Mar. 29, 2007, entitled "SPRING DRIVEN RAM FOR CLOSING AN ELECTRICAL SWITCHING APPARATUS", which is incorporated herein by reference.

BACKGROUND OF THE INVENTION

1. Field of the Invention

The present invention relates to an electrical switching apparatus and, more specifically, to a modular racking system for an electrical switching apparatus.

2. Background Information

An electrical switching apparatus, typically, includes a housing, at least one bus assembly having a pair of contacts, a trip device, and an operating mechanism. The housing assembly is structured to insulate and enclose the other components. The at least one pair of contacts include a fixed contact and a movable contact and typically include multiple pairs of fixed and movable contacts. Each contact is coupled to, and in electrical communication with, a conductive bus that is further coupled to, and in electrical communication with, an external line bus or a load bus. A trip device is structured to detect an over current condition and to actuate the operating mechanism. An operating mechanism is structured to both open the contacts, either manually or following actuation by the trip device, and close the contacts. That is, the operating mechanism includes both a closing assembly and an opening assembly, which may have common elements, that are structured to move the movable contact between a first, open position, wherein the contacts are separated, and a second, closed position, wherein the contacts are coupled and in electrical communication.

Typically, an electrical switching apparatus was either fixed in an enclosure or adapted to be a draw-out electrical switching apparatus. A fixed electrical switching apparatus was fixed to the line and load bus within the enclosure. A draw-out electrical switching apparatus included a disconnect or terminal on each conductive bus. Similarly, the line and load bus within the enclosure for a draw-out electrical switching apparatus each included a disconnect or terminal. Thus, as the draw-out electrical switching apparatus is being inserted into the enclosure, the draw-out electrical switching apparatus disconnects engage, and become in electrical communication with, the enclosure terminals. Conversely, when the draw-out electrical switching apparatus is moved out of the enclosure, the draw-out electrical switching apparatus disconnects disengage from the enclosure terminals.

Typically, the draw-out electrical switching apparatus includes a plurality of wheels structured to travel over a corresponding set of rails within the enclosure. In this configuration, the draw-out electrical switching apparatus disconnects and the enclosure disconnects are generally aligned. Further, a racking device is typically used to move the draw-out electrical switching apparatus into, and out of, the enclosure. The racking device includes an interlock actuator, discussed below, and a racking actuator. The racking actuator helps move the electrical switching apparatus over the rails and ensures that the disconnects fully engage each other during insertion and helps overcome frictional forces during removal.

As the enclosure line and load buses typically carry current when the electrical switching apparatus contacts are closed, it is very dangerous to move the draw-out electrical switching apparatus into, and out of, the enclosure with the contacts closed. Further, the operating mechanism closing assembly and opening assembly both utilize one or more springs to close and open the contacts. These springs, when charged, store mechanical energy. To ensure that the electrical switching apparatus contacts are not closed as the draw-out electrical switching apparatus is moved in or out of the enclosure, the draw-out electrical switching apparatus includes one or more interlock assemblies. Further, the electrical switching apparatus includes an interlock structured to release any stored mechanical energy within the opening or closing springs. An interlock assembly for the contacts engages the draw-out electrical switching apparatus operating mechanism and, when actuated, places the contacts in the first, open position. That is, if the contacts were in the second, closed position, the interlock assembly moves the contacts to, and maintains the contacts in, the first, open position, and, if the contacts were in the first, open position, the interlock assembly prevents the contacts from moving to the second, closed position. An interlock for the stored mechanical energy device also engages the draw-out electrical switching apparatus operating mechanism and, when actuated, releases the stored energy. The interlock assemblies are, typically, actuated by the racking device interlock actuator. The interlock assembly and the racking device interlock actuator are typically fixed to each other by one or more fasteners. Thus, any time the racking device is utilized, the interlock assembly should ensure that the springs are discharged, the contacts are open and the draw-out electrical switching apparatus may be safely moved.

Because a fixed electrical switching apparatus is not typically disconnected from the enclosure line and load buses, a fixed electrical switching apparatus does not include the racking device or a set of wheels structured to engage enclosure rails. Thus, manufacturers, typically, make two versions of an electrical switching apparatus; one that is structured to be a fixed electrical switching apparatus and one that is structured as a draw-out electrical switching apparatus. To reduce manufacturing costs, it would be advantageous to have a modular racking system that could be optionally added to an electrical switching apparatus. Further, customers may wish to adapt a fixed electrical switching apparatus to be a draw-out electrical switching apparatus, or vice-versa.

There is, therefore, a need for a modular racking system that may be removably coupled to an electrical switching apparatus.

There is a further need for a modular racking system wherein the modular racking system may be added to the electrical switching apparatus late in the manufacturing process or by a customer.

SUMMARY OF THE INVENTION

These needs, and other, are met by at least one embodiment of the present invention which provides a modular racking system. It is noted that the electrical switching apparatus is made with at least one interlock assembly coupled to the operating mechanism structured to place the contacts in the open position and discharge any stored mechanical energy. The modular racking system includes a carriage assembly structured to support electrical switching apparatus and at least one cam follower structured to be removably coupled to the electrical switching apparatus. The carriage assembly includes a set of wheels structured to engage the enclosure rails and at least one cam structured to functionally engage the at least one cam follower. The cam is structured to be actuated by the racking actuator. The at least one cam follower is structured to functionally engage and actuate the interlock assembly. When the electrical switching apparatus is coupled to the modular racking system and moved into, or out of, an enclosure by a racking actuator, the racking actuator actuates the cam. The cam actuates the cam follower which, in turn, actuates the interlock assembly. When the interlock assembly is actuated, the electrical switching apparatus contacts are placed in the first, open position and any stored mechanical energy is discharged.

The modular racking system is removably coupled to the electrical switching apparatus and the electrical switching apparatus may be easily detached from the modular racking system. That is, unlike a typical interlock and racking device interlock actuator that are coupled by fasteners or other hardware, the present invention provides for a non-fixed coupling between the interlock and racking device interlock actuator. This coupling is the cam and at least one cam follower set forth above. The cam and the at least one cam follower interface with each other. The cam is, preferably, disposed on the carriage assembly. Further, the at least one cam follower is removably coupled to an external, or easily accessed, portion of the electrical switching apparatus.

In this configuration, a fixed electrical switching apparatus that has an interlock assembly may be converted to a draw-out electrical switching apparatus by disposing the electrical switching apparatus on the carriage and coupling the at least one cam follower to the electrical switching apparatus. Because the carriage is a separate component structured to support electrical switching apparatus and because the at least one cam follower is removably coupled to an external, or easily accessed, portion of the electrical switching apparatus, the modular racking system may be added to the electrical switching apparatus late in the manufacturing process or even after the manufacture of the electrical switching apparatus is complete.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components so coupled move as one.

As used herein, the phrase "removably coupled" means that one component is coupled with another component in an essentially temporary manner. That is, the two components are coupled in such a way that the joining or separation of the components is easy and would not damage the components. For example, two components secured to each other with a limited number of readily accessible fasteners are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "correspond" indicates that two structural components are sized to engage each other with a minimum amount of friction. Thus, an opening which corresponds to a member is sized slightly larger than the member so that the member may pass through the opening with a minimum amount of friction.

As used herein, "functionally engage" means that, where two components are structured to move, a first component that engages the second component so as to move the second component may be said to "functionally engage" the second component.

As used herein, the phrase "interface with" means that two or more components are coupled together without a required fastening device or means. By way of a non-limiting example, a key may be said to interface with a keyhole. That is, a key engages, or functionally engages, the keyhole, but no fastening device or means, such as a bolt or glue is required. It is further noted that, while no fastening device or means is required, a fastening device or means may still be used.

As used herein, when an interlock assembly "makes safe" an electrical switching apparatus operating mechanism by placing the contacts in an open configuration and/or discharging any significant mechanical energy. "Significant mechanical energy" is typically stored in springs such as, but not limited to, the closing springs and the opening springs.

Figure 1:
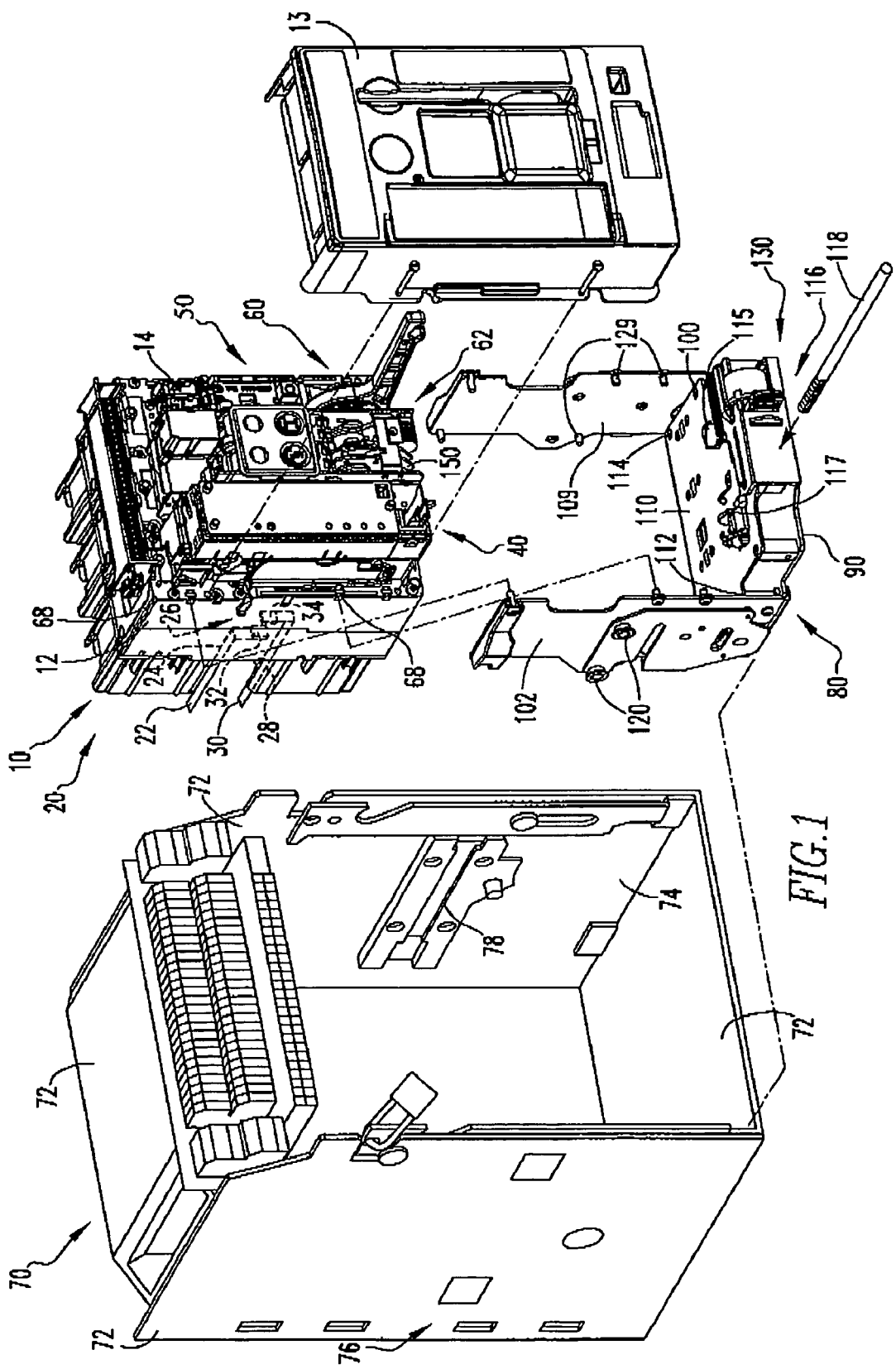
FIG. 1 is an exploded view of an electrical switching apparatus and a modular racking system.

As shown in FIG. 1, an electrical switching apparatus 10 includes a housing assembly 12 defining an enclosed space 14. The housing assembly 12 preferably includes a removable front cover 13. The electrical switching apparatus 10 further includes a conductor assembly 20 (shown schematically) having at least one line terminal 22, at least one line conductor 24, at least one pair of separable contacts 26, at least one load conductor 28 and at least one load terminal 30. The at least one pair of separable contacts 26 include a fixed contact 32 and a movable contact 34. The movable contact 34 is structured to move between a first, open position, wherein the contacts 32, 34 are separated, and a second, closed position, wherein the contacts 32, 34 contact each other and are in electrical communication. The electrical switching apparatus 10 further includes a trip device 40 and an operating mechanism 50. The operating mechanism 50 is generally structured to move the at least one pair of separable contacts 26 between the first, open position and the second, closed position. The operating mechanism 50 utilizes one or more springs (not shown) to open and close the at least one pair of separable contacts 26. These springs may be charged manually or by a motor operator. The trip device 40 is structured to detect an over current condition and, upon detecting such a condition, to actuate the operating mechanism 50 to open the at least one pair of separable contacts 26.

Figure 2:
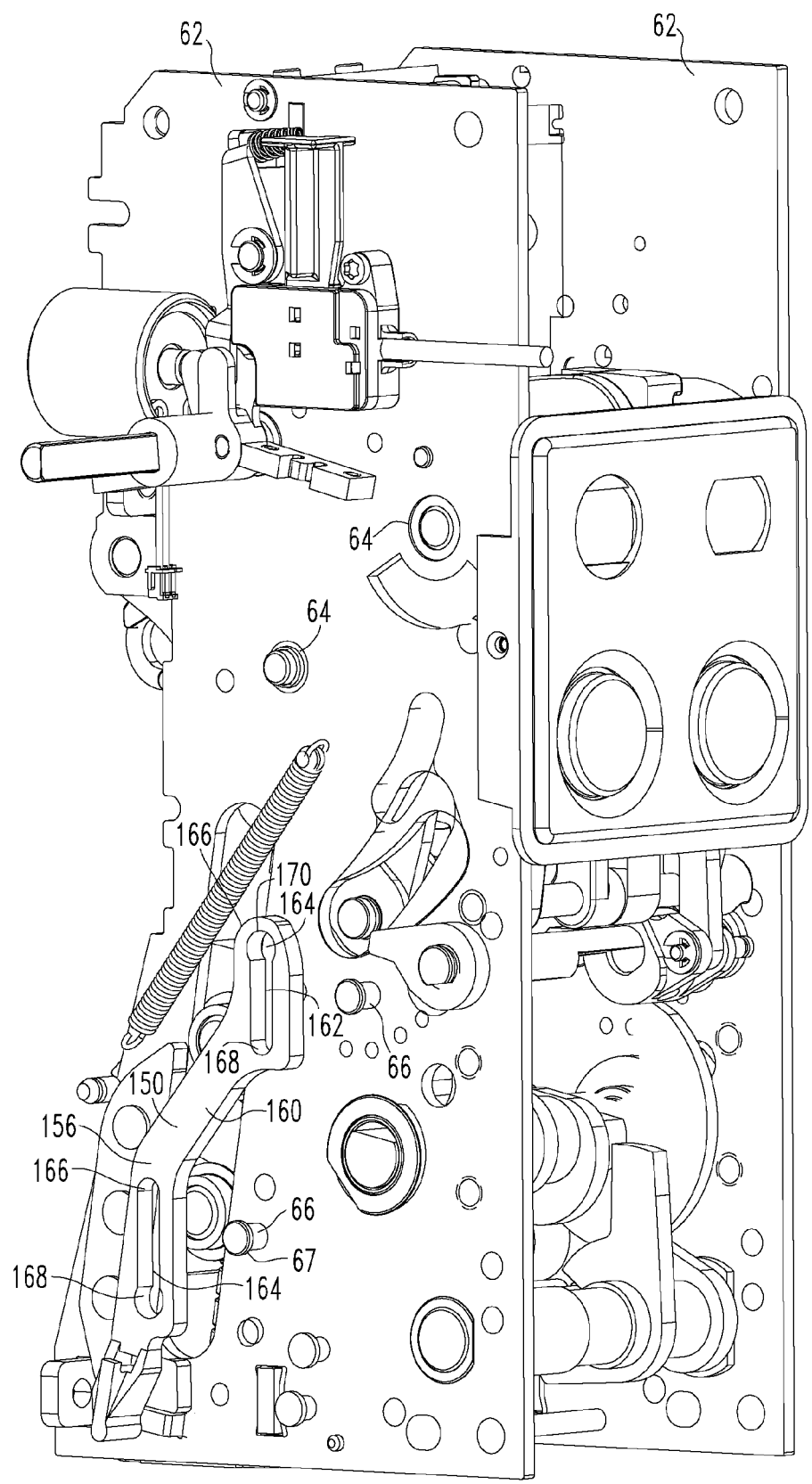
FIG. 2 is a detail view of one side of the electrical switching apparatus.
Figure 3:
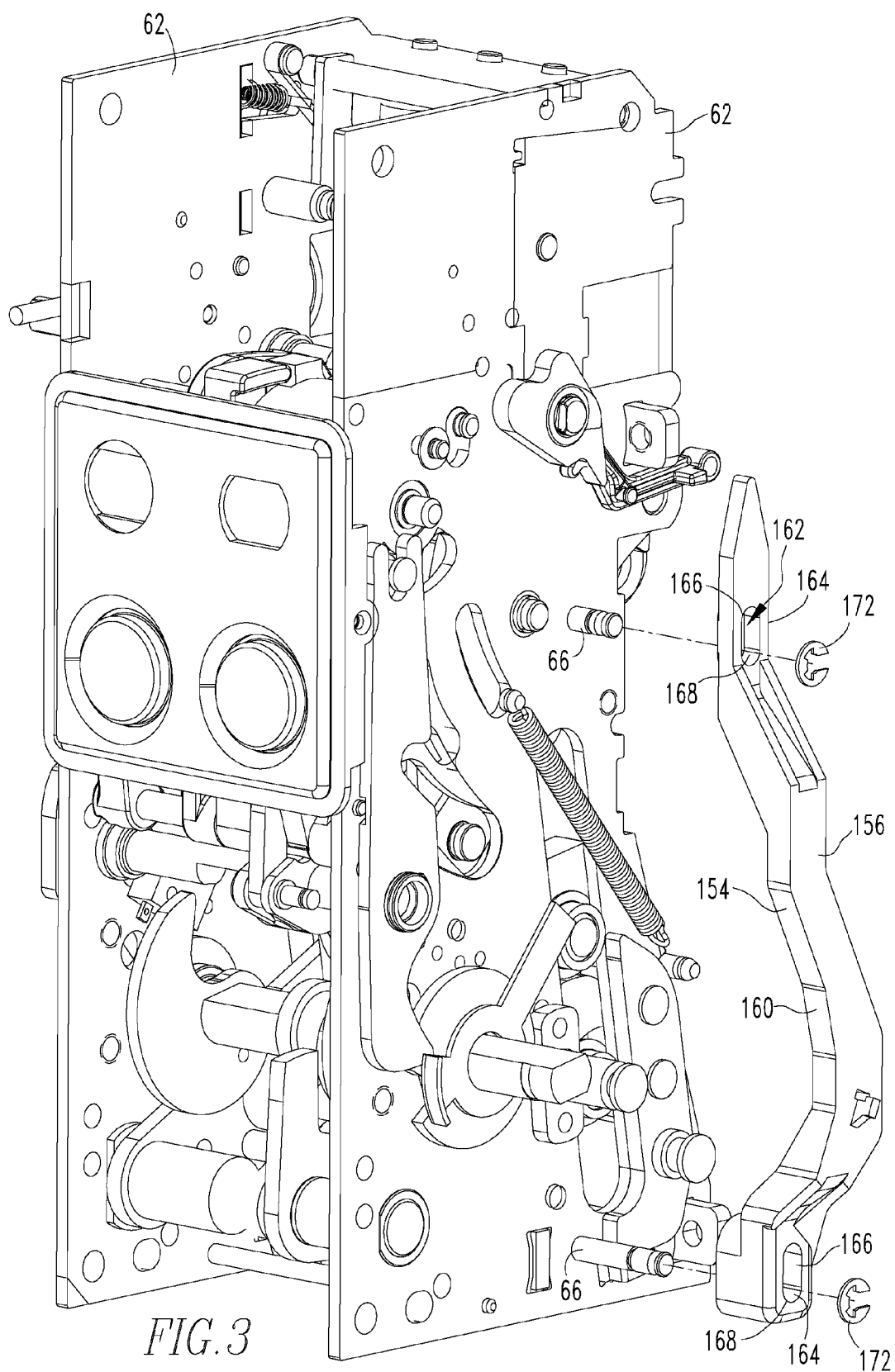
FIG. 3 is a detail view of the other side of the electrical switching apparatus.

The operating mechanism 50 further includes at least one interlock assembly 60. The at least one interlock assembly 60 is structured to place the at least one pair of separable contacts 26 in the first, open position when actuated. The housing assembly 12, preferably, includes a plurality of side plates 62 structured to support the other electrical switching apparatus 10 components. As shown in FIGS. 2 and 3, the side plates 62 are generally parallel and include a plurality of openings 64 through which the other electrical switching apparatus 10 components may extend. The side plates 62 further include a plurality of laterally extending pins 66 structured to support the at least one cam follower 150, discussed below. The housing assembly 12 may also include a plurality of external fastener openings 68 (FIG. 1) positioned to align with the carriage assembly plurality of fasteners 129, discussed below. Further, on the outer sides of the side plates 62, the at least one interlock assembly 60 includes one, or more, actuators 69. The interlock assembly actuators 69 are structured to move between a first position and a second position. When the interlock assembly actuator 69 is moved into the first position, the at least one interlock assembly 60 is actuated.

The electrical switching apparatus 10 may be disposed in an enclosure 70. The enclosure 70 includes a plurality of sidewalls 72 defining an enclosed space. The enclosure sidewalls 72 include a right sidewall 74 and a left sidewall 76. The right sidewall 74 and the left sidewall 76 each have an elongated, generally horizontal rail 78 coupled thereto.

As shown in FIG. 1, a modular racking system 80 is structured to be removably coupled to the electrical switching apparatus 10 and structured to assist in moving the electrical switching apparatus 10 in and out of the enclosure 70. The racking system 80 includes a carriage assembly 90 and at least one cam follower 150. The carriage assembly 90 includes a base assembly 100, a first vertical side member 102 and a second vertical side member 104. The base assembly 100 includes a base plate 110 with a first lateral side 112, a second lateral side 114, and at least one cam 116 structured to functionally engage the at least one cam follower 150 as discussed below. The base assembly 100 is structured to support the electrical switching apparatus 10. The at least one cam 116 is structured to be actuated by a racking operator 118, discussed below. The at least one cam 116, preferably, includes a first cam 115 and a second cam 117. The first vertical side member 102 is coupled to the base assembly first lateral side 112. The second vertical side member 104 is coupled to the base assembly second lateral side 114. Thus, the combination of the base plate 110 with the first lateral side 112 and the second lateral side 114 have a generally U-shaped configuration. The base plate 110 has a width sized to accommodate the electrical switching apparatus 10. The first vertical side member 102 has at least one wheel 120, and preferably two wheels 120, structured to engage an enclosure rail 78. The second vertical side member 104 also has at least one wheel 120, and preferably two wheels 120, structured to engage an enclosure rail 78. Both the first vertical side member 102 and the second vertical side member 104 include a plurality of fasteners 129 structured to removably couple the electrical switching apparatus 10 to the carriage assembly 90.

Figure 4:
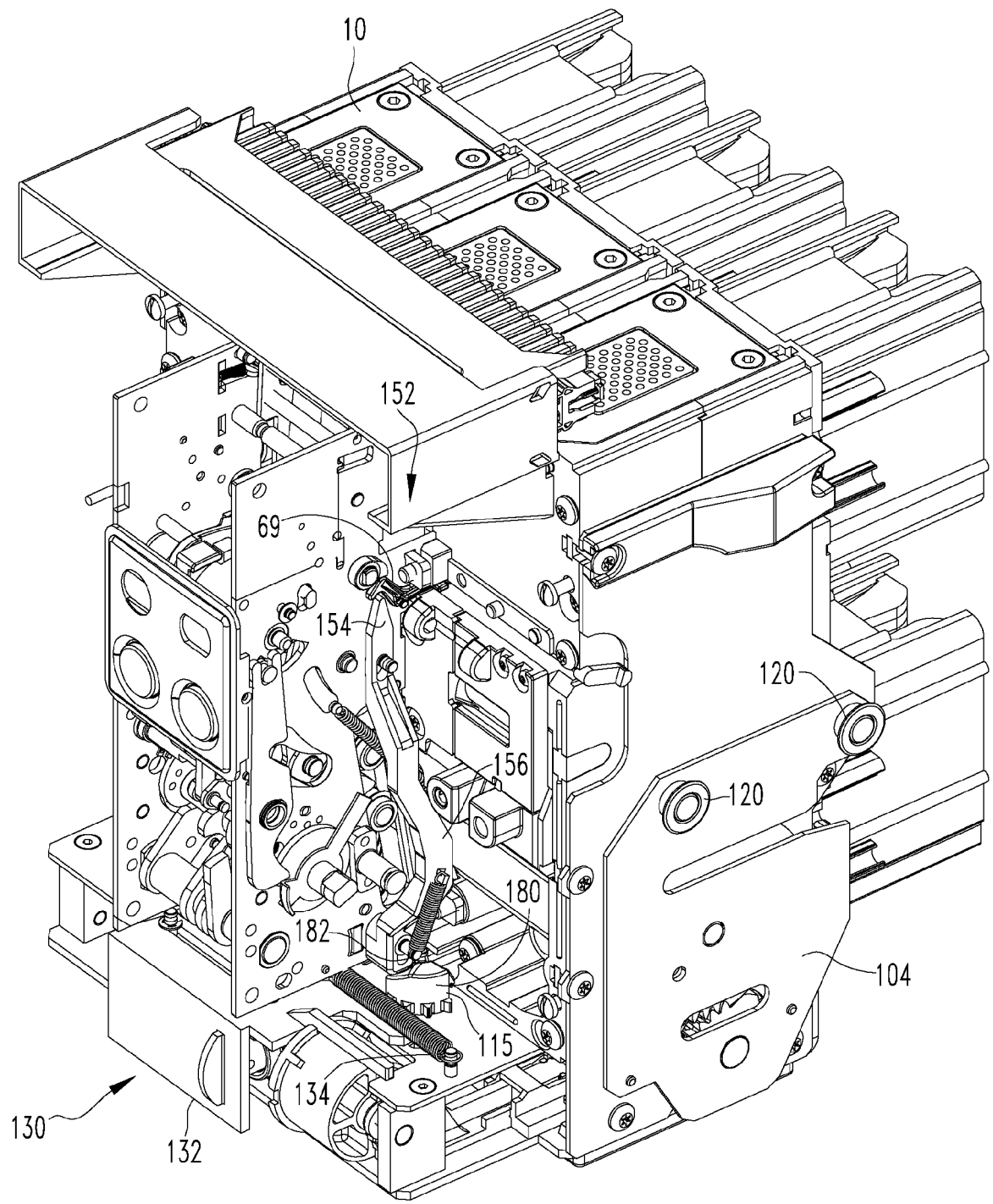
FIG. 4 is an isometric view of an electrical switching apparatus and a modular racking system with an interlock operator in a second position.
Figure 5:
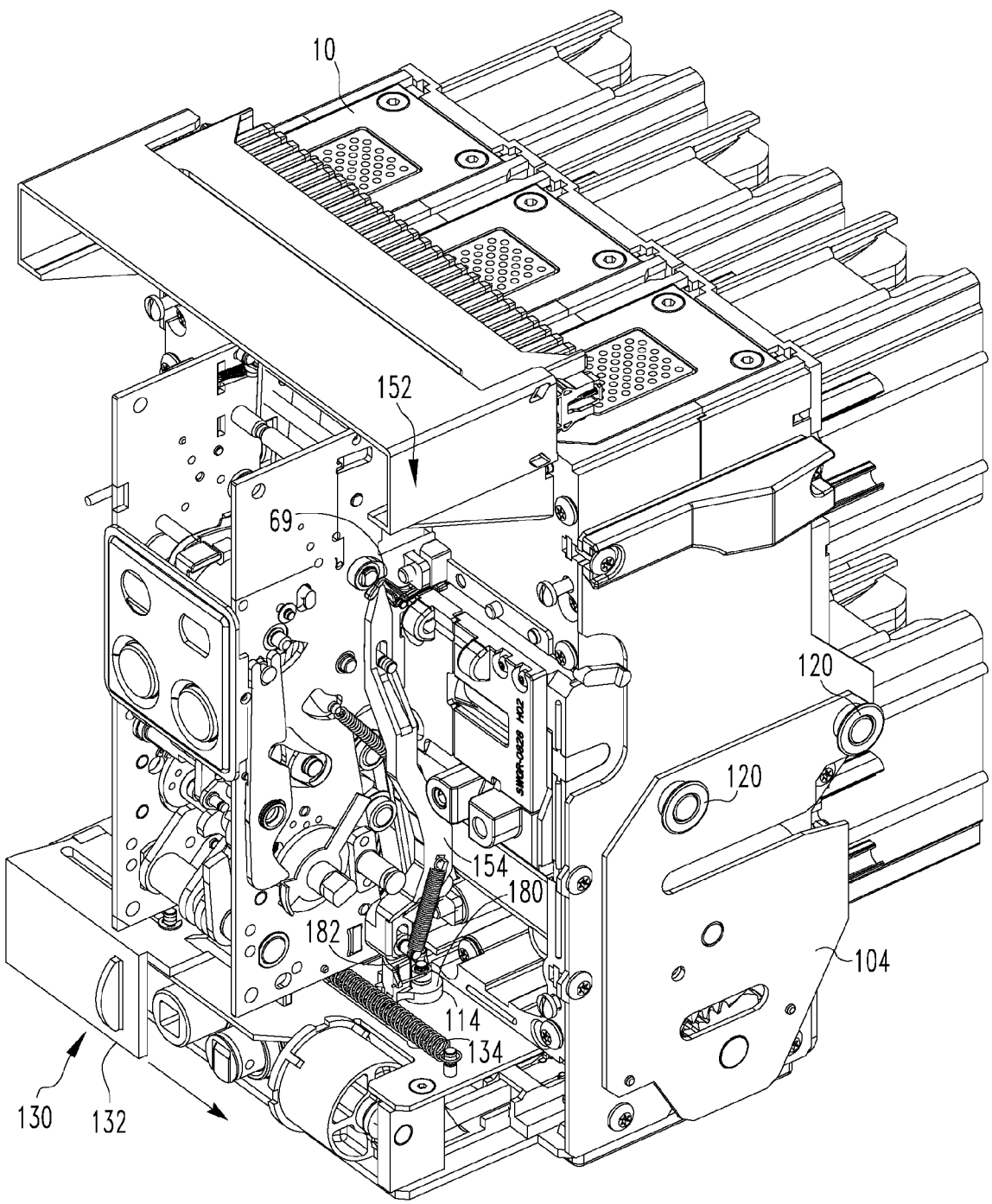
FIG. 5 is an isometric view of an electrical switching apparatus and a modular racking system with an interlock operator in a first position.

As shown in FIGS. 4 and 5, the base assembly 100, preferably, includes a racking operator door assembly 130. The door assembly 130 has a movable door 132 and a cam actuator link assembly 134. The door 132 is structured to be moved between a first, open position (FIG. 5) and a second, closed position (FIG. 4). It is noted that the door 132 first, open position does not require the door 132 to be fully open. The door 132 is functionally coupled to, and structured to actuate, the cam actuator link assembly 134. The cam actuator link assembly 134 is structured to move between a first, actuated position and a second, un-actuated position. The cam actuator link assembly 134 being in the first, actuated position when the door 132 is in the first, open position and the cam actuator link assembly 134 being in the second, un-actuated position when the door 132 is in the second, closed position. The cam actuator link assembly 134 is further coupled to the at least one cam 116 and, preferably to the first cam 115. When the door 132 is moved to the first, open position, the cam actuator link assembly 134 is moved to its first, actuated position and the at least one cam 116 is actuated.

The base assembly 100 may also include a racking operator link assembly 140. The racking operator link assembly 140 is structured to be coupled to, and actuated by, the racking operator 118. The racking operator link assembly 140 is further coupled to, and structured to actuate, the second cam 117. Thus, when the racking operator 118 is actuated to move the electrical switching apparatus 10 into, or out of, the enclosure 70, the second cam 117 is actuated via the racking operator link assembly 140.

Figure 6:
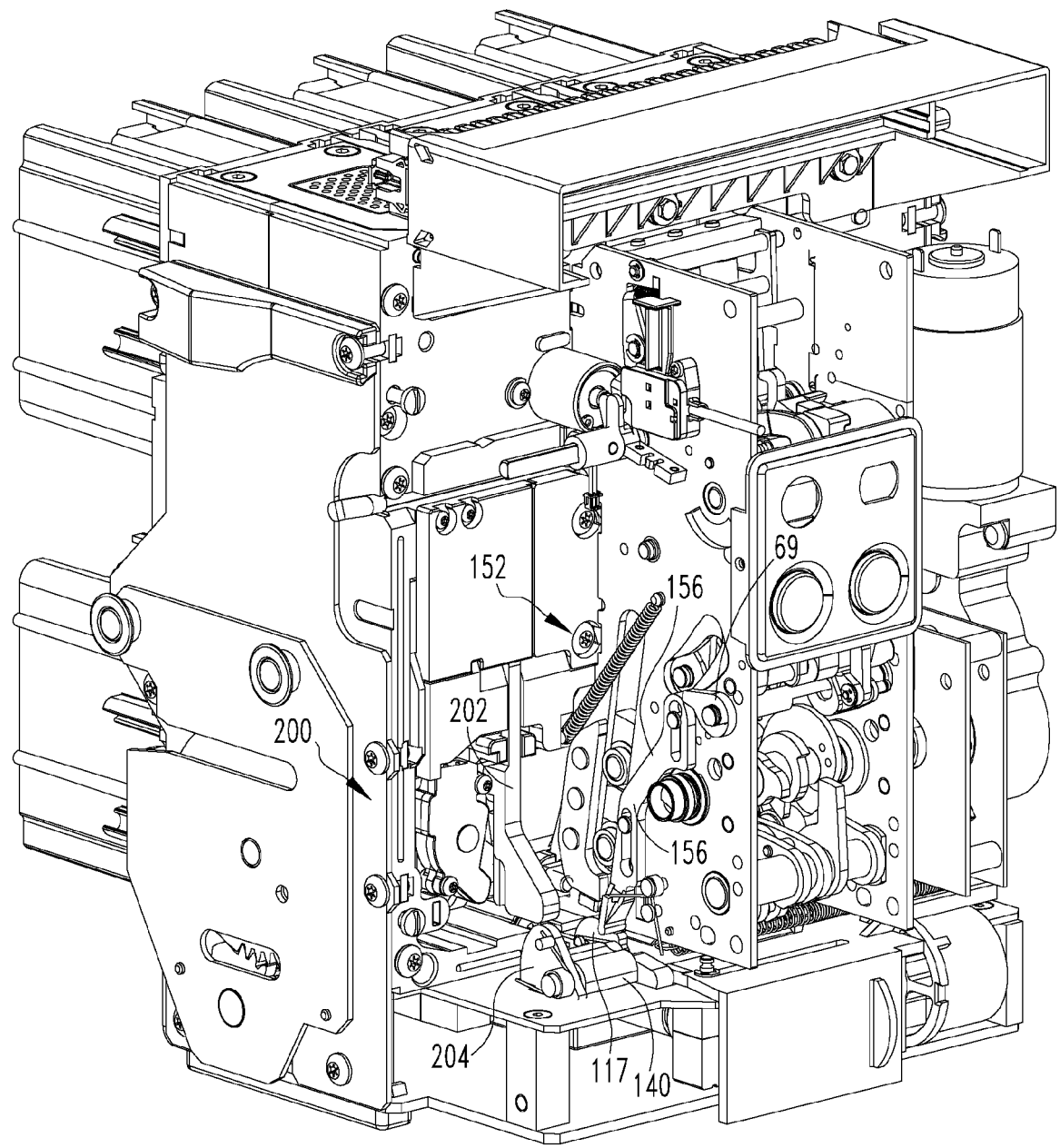
FIG. 6 is an isometric view of an electrical switching apparatus and a modular racking system with another interlock operator in a second position.
Figure 7:
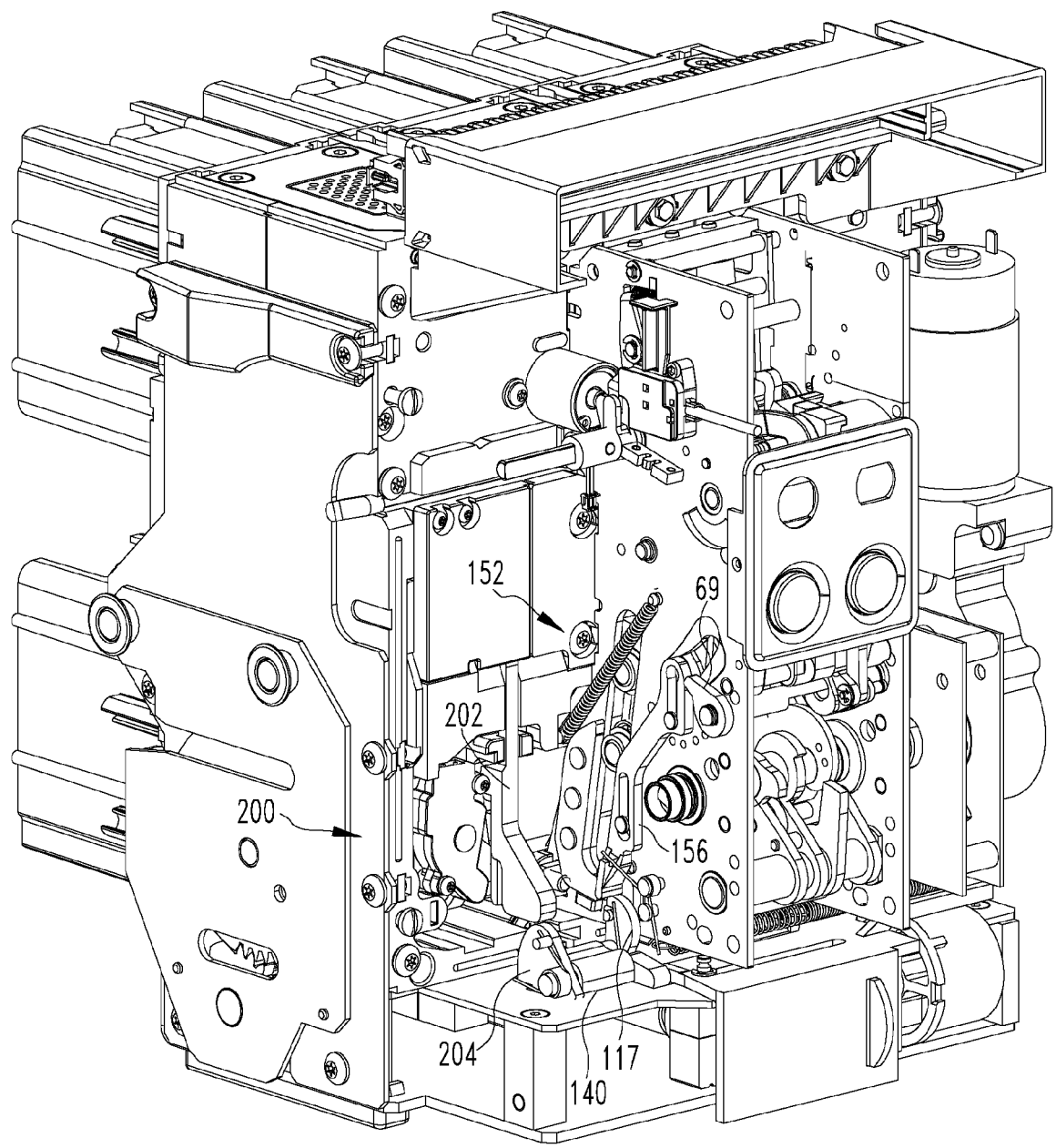
FIG. 7 is an isometric view of an electrical switching apparatus and a modular racking system with another interlock operator in a first position.

The at least one cam follower 150 is an interlock operator 152. That is, the at least one cam follower 150 is structured to functionally engage and actuate the interlock assembly 60. The at least one cam follower 150, preferably, includes a first cam follower 154 (FIGS. 3-5) and a second cam follower 156 (FIGS. 2, 6, and 7). Each cam follower 154, 156 has an elongated body 160 which is not necessarily generally straight. Each cam follower body 160 has at least one opening 162 structured to be disposed over a housing assembly pin 66. Preferably, the at least one opening 162 is two elongated slots 164. The slots 164 extend generally parallel to each other. Each slot 164 has a first end 166 and a second end 168. The slots 164 are structured to be disposed over two of the extending pins 66. In this configuration, the at least one cam follower 150 is structured to move between a first position, wherein each pin 66 is adjacent to the first end of the associated slot 164, and a second position, wherein each pin 66 is adjacent to the second end of the associated slot 164.

The at least one cam follower 150 is, preferably, coupled to the electrical switching apparatus 10 without fasteners. That is, as shown in FIG. 2, each slot 164 may have a key 170 that is a wide portion. The pins 66 would have a flat head 67 sized to pass through the key 170, but which is too large to pass through the slot 164. Alternatively, a non-threaded fastener 172, such as, but not limited to, an E-clip, may be used to removably couple the at least one cam follower 150 to the electrical switching apparatus 10.

In this configuration, the electrical switching apparatus 10 may be removably coupled to the modular racking system 80. The at least one cam follower 150 is removably coupled to the electrical switching apparatus 10 as set forth above. When the electrical switching apparatus 10 is disposed on the carriage assembly 90, the carriage assembly 90 at least one cam 116 functionally engages the at least one cam follower 150. More specifically, the first cam 115 interfaces with the first cam follower 154 and the second cam 117 interfaces with the second cam follower 156. The electrical switching apparatus 10 may be further secured to the carriage assembly 90 by threading the carriage assembly plurality of fasteners 129 into the housing assembly openings 68. A racking operator 118, which is typically an elongated, screw operated device, is coupled to the base assembly 100 via the door assembly 130. The racking operator 118 also functionally engages the racking operator link assembly 140 which further functionally engages the second cam 117. Thus, prior to the racking operator 118 passing through the door 132, the door 132 is moved from the second, closed position (FIG. 4) to the first, open position (FIG. 5). This causes the cam actuator link assembly 134 to move into the first, actuated position which in turn actuates the first cam 115. As shown in FIGS. 4 and 5, the first cam 115 is preferably a disk shaped body 180 having an inclined upper surface 182. Thus, the first cam 115 is actuated by rotating the first cam body 180 between a first position (FIG. 5) and a second position (FIG. 4). When the first cam 115 is actuated, the first cam follower 154 moves thereby actuating the interlock assembly 60 causing the at least one pair of separable contacts 26 to be placed in the first, open position. That is, as shown in FIGS. 4 and 5, the first cam 115 moves the first cam follower 154 between a first position a first position (FIG. 5) and a second position (FIG. 4). The upper end of the first cam follower 154 engages an interlock assembly actuator 69. Thus, when the first cam 115 rotates, the first cam follower 154 is moved upwards as the first cam follower 154 slides over the first cam body inclined upper surface 182. As the first cam follower 154 is moved upwardly, the first cam follower 154 moves the interlock assembly actuator 69 from the second position to the first position, thereby actuating the at least one interlock assembly 60 causing the at least one pair of separable contacts 26 to be placed in the first, open position and/or discharging the operating mechanism springs.

Alternatively, when the racking operator 118 is actuated to insert or remove the electrical switching apparatus 10 relative to the enclosure 70, the racking operator 118 also actuates the racking operator link assembly 140. The racking operator link assembly 140 further actuates the second cam 117 to move from a second position (FIG. 6) to a first position (FIG. 7). As the second cam 117 moves into the first position, the second cam 117 actuates the second cam follower 156. That is, the second cam follower 156 is lifted. The upper end of the second cam follower 156 is also coupled to an interlock assembly actuator 69. As the second cam follower 156 is moved upwardly, the second cam follower 156 moves the interlock assembly actuator 69 from the second position to the first position, thereby actuating the at least one interlock assembly 60 causing the at least one pair of separable contacts 26 to be placed in the first, open position and/or discharging the operating mechanism springs.

In addition to placing the contacts 26 in the open position, the at least one interlock assembly 60 is, preferably, structured to prevent coupling the racking operator 118 to the base assembly 100 when the contacts 26 are closed. That is, there are rare instances when the contacts 26 may become fused together. When this occurs, the operating mechanism 50 may not be able to move the contacts 26 into the open position. Thus, it may be dangerous to attempt to remove the electrical switching apparatus 10 from the enclosure 70. To reduce the chance of a user attempting to remove the electrical switching apparatus 10 from the enclosure 70 when the contacts 26 are closed, there is, preferably, a door assembly interlock 200.

Figure 8:
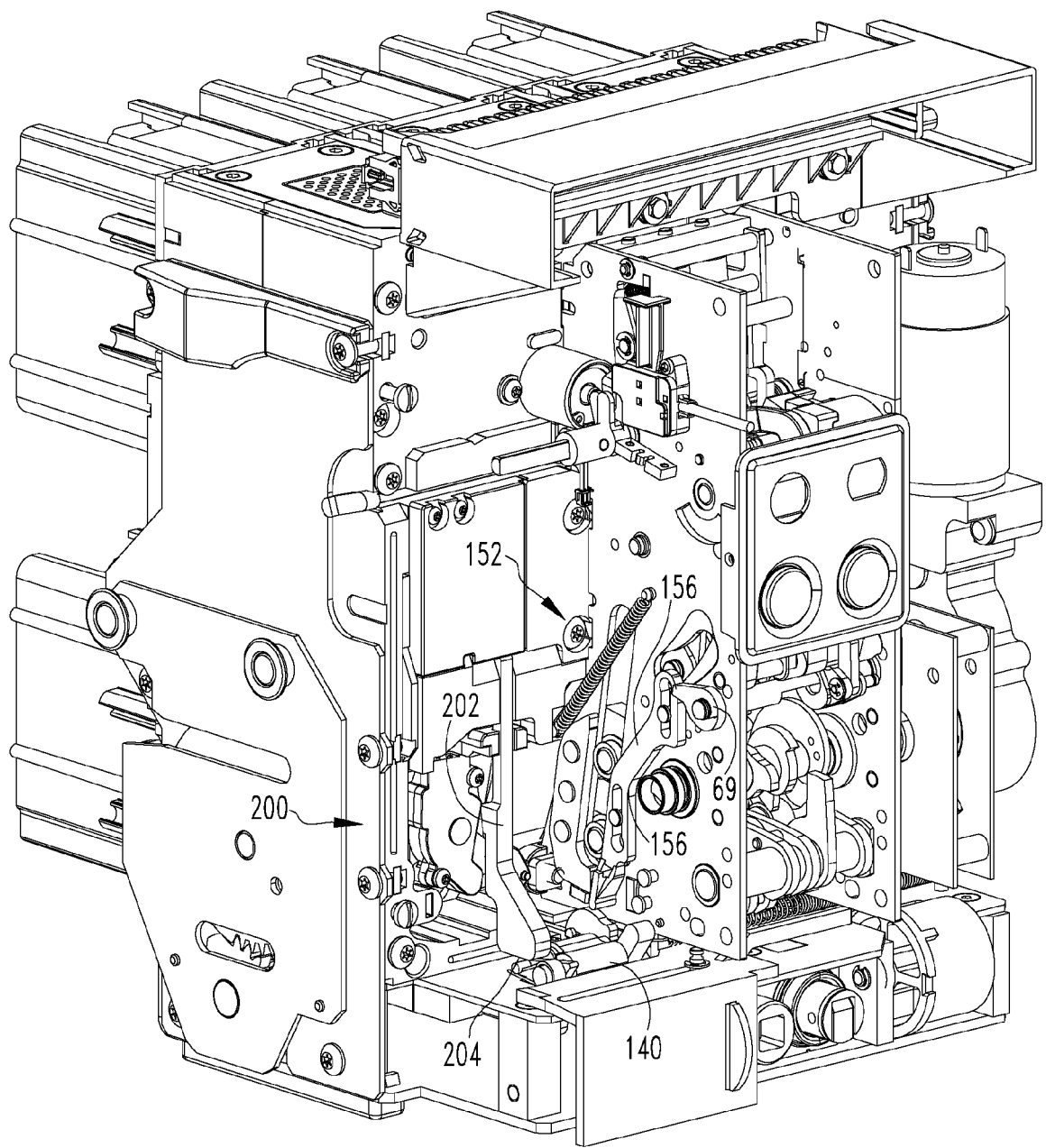
FIG. 8 is an isometric view of an electrical switching apparatus and a modular racking system with a door assembly interlock in a first position.

The door assembly interlock 200 includes a cam actuator 202 and a door cam 204. The door assembly interlock cam actuator 202 is disposed on the electrical switching apparatus 10 and is coupled to the operating mechanism and structured to be responsive to the position of the contacts 26. The door assembly interlock cam actuator 202 is structured to move between a first position (FIG. 8) when the contacts 26 are open, and a second position (FIG. 6) when the contacts 26 are closed. As shown, the door assembly interlock cam actuator 202 is an elongated member structured between move from a lower, first position (FIG. 8) to an upper second position (FIG. 6). The door cam 204 is disposed adjacent to the second cam 117. The door assembly interlock cam actuator 202 and the door cam 204 interface with each other. The door cam 204 is structured to move between a first position (FIG. 8) and a second position (FIG. 6) in response to actuation by the door assembly interlock cam actuator 202. The door cam 204 is moved from the second position to the first position when the door assembly interlock cam actuator 202 moves from the second position to the first position. The door cam 204 is coupled to the door assembly movable door 132 and structured to prevent the door assembly movable door 132 from being opened when the door cam 204 is in the second position. While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A modular racking system for an electrical switching apparatus, said electrical switching apparatus having a housing assembly with at least two generally parallel side plates, an operating mechanism coupled to said side plates and structured to move at least one pair of separable contacts between a first open position and a second closed position, said operating mechanism further including an interlock assembly structured to make safe the operating mechanism when actuated, said electrical switching apparatus being adapted to be moved in and out of an enclosure by a racking operator, said enclosure having a pair of rails, said modular racking system comprising:

a carriage assembly structured to support said electrical switching apparatus, said carriage assembly having at least one wheel structured to engage each said enclosure rail and at least one cam structured to functionally engage a cam follower, said at least one cam structured to be actuated by a racking operator;

at least one cam follower structured to be removably coupled to at least one of said electrical switching apparatus side plates, said at least one cam follower structured to functionally engage said interlock assembly;

wherein, when said at least one cam follower is coupled to said electrical switching apparatus, said cam follower functionally engages said interlock assembly;

wherein when said electrical switching apparatus is disposed on said carriage assembly, said carriage assembly at least one cam functionally engages said at least one cam follower; and wherein when said at least one cam is actuated by said racking operator, said carriage assembly at least one cam actuates said at least one cam follower and said at least one cam follower actuates said interlock assembly.

2. The modular racking system of claim 1 wherein said electrical switching apparatus interfaces with said carriage assembly.

3. The modular racking system of claim 2 wherein said at least one cam interfaces with said at least one cam follower.

4. The modular racking system of claim 1 wherein said carriage assembly includes a plurality of fasteners structured to removably couple said electrical switching apparatus to said carriage assembly.

5. The modular racking system of claim 4 wherein said at least one cam interfaces with said at least one cam follower.

6. The modular racking system of claim 5 wherein:
said carriage assembly includes a racking operator door assembly, said door assembly having a movable door and a cam actuator link assembly;
said door structured to be moved between a first, open position and a second, closed position, said door further operatively coupled to said cam actuator link assembly;
said cam actuator link assembly structured to move between a first, actuated position and a second, un-actuated position, said cam actuator link assembly being in said first, actuated position when said door is in said first, open position and said cam actuator link assembly being in said second, un-actuated position when said door is in said second, closed position;
said cam actuator link assembly further coupled to said at least one cam; and
wherein when said door is moved to said first, open position, said cam actuator link assembly is moved to said first, actuated position and said at least one cam is actuated.

7. The modular racking system of claim 6 wherein:
said at least one cam includes two cams, a first cam and a second cam;
said at least one cam follower includes two cam followers, a first cam follower and a second cam follower;
wherein when said electrical switching apparatus is disposed on said carriage assembly, said carriage assembly first cam functionally engages said first cam follower;
when said electrical switching apparatus is disposed on said carriage assembly, said carriage assembly second cam functionally engages said second cam follower;
said first cam structured to be actuated when said door is moved to said first position; and
said second cam structured to be actuated when said racking operator is actuated.

8. The modular racking system of claim 6 wherein:
said carriage assembly includes a door assembly interlock having a cam actuator and a door cam;
said door assembly interlock cam actuator coupled to said operating mechanism and structured to be responsive to the position of said contacts, said door assembly interlock cam actuator structured to move between a first position when said contacts are open, and a second position when said contacts are closed;
said door cam structured to move between a first position and a second position in response to actuation by said door assembly interlock cam actuator;
said door cam coupled to said door assembly is coupled to said door assembly movable door and is structured to prevent the door assembly movable door from being opened when the door cam is in the second position.

9. A modular racking system for an electrical switching apparatus, said electrical switching apparatus having a housing assembly with at least two generally parallel side plates, an operating mechanism coupled to said side plates and structured to move at least one pair of separable contacts between a first open position and a second closed position, said operating mechanism further including an interlock assembly structured to make safe the operating mechanism when actuated, said electrical switching apparatus being adapted to be moved in and out of an enclosure by a racking operator, said enclosure having a pair of rails, said modular racking system comprising:
a carriage assembly structured to support said electrical switching apparatus, said carriage assembly having at least one wheel structured to engage each said enclosure rail and at least one cam structured to functionally engage a cam follower, said at least one cam structured to be actuated by a racking operator;
at least one cam follower structured to be removably coupled to at least one of said electrical switching apparatus side plates, said at least one cam follower structured to functionally engage said interlock assembly;
wherein, when said at least one cam follower is coupled to said electrical switching apparatus, said cam follower functionally engages said interlock assembly;
wherein when said electrical switching apparatus is disposed on said carriage assembly, said carriage assembly at least one cam functionally engages and interfaces with said at least one cam follower; and
wherein when said at least one cam is actuated by said racking operator, said carriage assembly at least one cam actuates said at least one cam follower and said at least one cam follower actuates said interlock assembly.

10. The modular racking system of claim 9 wherein:
said carriage assembly includes a racking operator door assembly, said door assembly having a movable door and a cam actuator link assembly;
said door structured to be moved between a first, open position and a second, closed position, said door further operatively coupled to said cam actuator link assembly;
said cam actuator link assembly structured to move between a first, actuated position and a second, un-actuated position, said cam actuator link assembly being in said first, actuated position when said door is in said first, open position and said cam actuator link assembly being in said second, un-actuated position when said door is in said second, closed position;
said earn actuator link assembly further coupled to said at least one cam; and
wherein when said door is moved to said first, open position, said cam actuator link assembly is moved to said first, actuated position and said at least one cam is actuated.

11. The modular racking system of claim 10 wherein:
said at least one cam includes two cams, a first cam and a second cam;
said at least one cam follower includes two cam followers, a first cam follower and a second cam follower;
wherein when said electrical switching apparatus is disposed on said carriage assembly, said carriage assembly first cam functionally engages said first cam follower;
when said electrical switching apparatus is disposed on said carriage assembly, said carriage assembly second cam functionally engages said second cam follower;
said first cam structured to be actuated when said door is moved to said first position; and
said second cam structured to be actuated when said racking operator is actuated.

12. A carriage assembly for an electrical switching apparatus modular racking system, said electrical switching apparatus having a housing assembly with at least two generally parallel side plates, an operating mechanism coupled to said side plates and structured to move at least one pair of separable contacts between a first open position and a second closed position, said operating mechanism further including an interlock assembly structured to make safe the operating mechanism when actuated, at least one cam follower coupled to at least one of said electrical switching apparatus side plates, said cam follower operatively engaging said interlock assembly, said electrical switching apparatus being adapted to be moved in and out of an enclosure by a racking operator, said enclosure having a pair of rails, said carriage assembly comprising:
- a base assembly having a base plate with a first lateral side, a second lateral side, and at least one cam structured to functionally engage a cam follower, said base assembly structured to support said electrical switching apparatus;
- said at least one cam structured to be actuated by a racking operator;
- a first vertical side member;
- a second vertical side member;
- said first vertical side member coupled to said base assembly first lateral side;
- said second vertical side member coupled to said base assembly second lateral side;
- said first vertical side member having at least one wheel structured to engage one said enclosure rail;
- said second vertical side member having at least one wheel structured to engage one said enclosure rail;
- wherein, when said electrical switching apparatus is disposed on said base assembly, said base assembly at least one cam functionally engages and interfaces with said at least one cam follower; and
- wherein when said at least one cam is actuated by said racking operator, said base assembly at least one cam actuates said at least one cam follower and said at least one cam follower actuates said interlock assembly.

13. The carriage assembly of claim 12 wherein:
- said base assembly includes a racking operator door assembly, said door assembly having a movable door and a cam actuator link assembly;
- said door structured to be moved between a first, open position and a second, closed position, said door further operatively coupled to said cam actuator link assembly;
- said cam actuator link assembly structured to move between a first, actuated position and a second, un-actuated position, said cam actuator link assembly being in said first, actuated position when said door is in said first, open position and said cam actuator link assembly being in said second, un-actuated position when said door is in said second, closed position;
- said cam actuator link assembly further coupled to said at least one cam; and
- wherein when said door is moved to said first, open position, said cam actuator link assembly is moved to said first, actuated position and said at least one cam is actuated.

14. The carriage assembly of claim 13 wherein said at least one cam follower includes two cam followers, a first cam follower and a second cam follower, and wherein:
- said at least one cam includes two cams, a first cam and a second cam;
- wherein when said electrical switching apparatus is disposed on said carriage assembly, said carriage assembly first cam functionally engages said first cam follower;
- when said electrical switching apparatus is disposed on said carriage assembly, said carriage assembly second cam functionally engages said second cam follower;
- said first cam structured to be actuated when said door is moved to said first position; and
- said second cam structured to be actuated when said racking operator is actuated.

15. The carriage assembly of claim 14 wherein said first vertical side member and said second vertical side member each include a plurality of fasteners structured to removably couple said electrical switching apparatus to said carriage assembly.

16. The carriage assembly of claim 12 wherein said first vertical side member and said second vertical side member each include a plurality of fasteners structured to removably couple said electrical switching apparatus to said carriage assembly.

17. An interlock operator for an electrical switching apparatus modular racking system, said electrical switching apparatus having a housing assembly with at least two generally parallel side plates, an operating mechanism coupled to said side plates and structured to move at least one pair of separable contacts between a first open position and a second closed position, said operating mechanism further including an interlock assembly structured to make safe the operating mechanism when actuated, said electrical switching apparatus being adapted to be moved in and out of an enclosure by a racking operator, said enclosure having a pair of rails, said interlock operator comprising:
- at least one cam follower structured to functionally engage said interlock assembly;
- said least one cam follower being removably coupled to at least one of said electrical switching apparatus side plates;
- wherein, said side plates include a plurality of extending pins and wherein:
- said at least one cam follower includes at least one opening; and
- said at least one cam follower opening structured to be disposed over at least one of said extending pins thereby removably coupling said at least one cam follower to said electrical switching apparatus side plate.

18. An interlock operator for an electrical switching apparatus modular racking system, said electrical switching apparatus having a housing assembly with at least two generally parallel side plates, an operating mechanism coupled to said side plates and structured to move at least one pair of separable contacts between a first open position and a second closed position, said operating mechanism further including an interlock assembly structured to make safe the operating mechanism when actuated, said electrical switching apparatus being adapted to be moved in and out of an enclosure by a racking operator, said enclosure having a pair of rails, said interlock operator comprising:
- at least one cam follower structured to functionally engage said interlock assembly;
- said least one cam follower being removably coupled to at least one of said electrical switching apparatus side plates;
- wherein, said side plates include a plurality of extending pins and wherein:
- said at least one cam follower includes an elongated body;
- said elongated body having two elongated slots therein, said elongated slots extending generally parallel to each other;
- each said slot having a first end and a second end;
- said at least one cam follower slots structured to be disposed over two of said housing assembly pins thereby removably coupling said at least one cam follower to said electrical switching apparatus side plate; and
- wherein said at least one cam follower is structured to move between a first position, wherein each said pin is adjacent to said first end of said associated slot, and a second position, wherein each said pin is adjacent to said second end of said associated slot.

19. The interlock operator of claim 18 wherein said at least one cam follower is coupled to at least one of said pins by a non-threaded fastener.

20. The interlock operator of claim 19 wherein said non-threaded fastener is an E-clip.

* * * * *